(12) United States Patent
Ruhter et al.

(10) Patent No.: US 6,286,897 B1
(45) Date of Patent: Sep. 11, 2001

(54) MOUNTING CONTROLS ON RIGHT REAR CORNER POST OF OPERATORS CAB

(75) Inventors: Martin Lavern Ruhter, Dubuque; David Joseph Klas, Dyersville; Andrew Wayne Kelly, Sherrill; James Robert Fullmer, Dubuque, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/546,471

(22) Filed: Apr. 10, 2000

(51) Int. Cl.$^7$ .................................................. B60K 26/00
(52) U.S. Cl. ............................ 296/190.01; 296/190.08; 296/70; 180/89.12
(58) Field of Search ................................ 296/70, 190.01, 296/190.08; 180/89.12, 90, 326, 321

(56) References Cited

U.S. PATENT DOCUMENTS

| | | | |
|---|---|---|---|
| 4,266,625 | * 5/1981 | Garner et al. | 296/190.08 X |
| 4,372,410 | * 2/1983 | Loken et al. | 296/190.01 X |
| 4,505,358 | * 3/1985 | Baier et al. | 180/326 X |
| 4,724,918 | * 2/1988 | Raineri | 296/70 X |
| 5,052,512 | * 10/1991 | Pakosh et al. | 180/326 X |
| 5,567,004 | * 10/1996 | Pietzsch | 296/70 X |

OTHER PUBLICATIONS

Deere & Company brochure entitled "All–New 50 Series Combines", cover and pp. 4–5, 8 and back cover, printed in the U.S.A., 1999.

Deere & Company brochure entitled "Skidders 548G–II, 648G–II, 748G–11", entire brochure, printed in the U.S.A., 1999.

Deere & Company Operator's Manual entitled "540G–II, 548G–II, 640G–II, 648G–II 748G–II", OMT162679 B8, cover, introduction and pp. 10–16–10–17, printed in the U.S.A., 1998.

* cited by examiner

*Primary Examiner*—Joseph D. Pape

(57) ABSTRACT

A work vehicle having a supporting frame and ground engaging wheels is provided with a work implement mounted to the rear portion of the work vehicle. The work implement is designed to drag a body behind the vehicle. The operations of the work vehicle is controlled from an operators cab mounted to the supporting frame. The operators cab is provided with a ROPS for protecting the operator. The ROPS is provided with four vertically extending supporting posts, left and right front supporting posts, and left and right rear supporting posts. An operators seat is located in the operators cab and is arranged diagonally to the longitudinal centerline of the vehicle. The operators seat faces both to the front and to the right side. The right rear corner post is provided with at least one operator control that is in the line of sight of the operator when seated in the operators seat.

13 Claims, 2 Drawing Sheets

MOUNTING CONTROLS ON RIGHT REAR CORNER POST OF OPERATORS CAB

BACKGROUND OF THE INVENTION

1. Field of the Invention

The invention is directed to mounting controls in the right rear corner post of a work vehicle.

2. Description of the Prior Art

Work vehicles are designed to perform a work operation. Many work vehicles are designed to pull a large body behind the vehicle. Examples of vehicles designed to pull a large body, include logging skidders and agricultural tractors. It has been found that an operator of a logging skidder may spend sixty (percent) of his or her time looking forward and forty (percent) of his or her time looking rearward to check the log skidding operation.

Typically the operator controls for a work vehicle are located on a forward console so the operator can easily view and access the controls during operations. In addition, in combines and other agricultural work vehicles, controls and monitors are placed on the front corner posts of the operators cab. These front corner posts may form part of the roll over protection system (ROPS). In this way the operator can easily locate the controls and monitors, as they are not out of the operator's forward line of sight.

SUMMARY OF THE INVENTION

It is an object of the present invention to provide a convenient location for locating operator controls that are in the line of sight of an operator when operating a rear mounted work implement for dragging a body.

A work vehicle having a supporting frame and ground engaging wheels is provided with a work implement mounted to the rear portion of the work vehicle. The work implement is designed to drag a body behind the vehicle. The operation of the work vehicle is controlled from an operators cab mounted to the supporting frame. The operators cab is provided with a ROPS for protecting the operator. The ROPS is provided with four vertically extending supporting posts, left and right front supporting posts, and left and right rear supporting posts. An operators seat is located in the operators cab and is arranged diagonally to the longitudinal centerline of the vehicle. In the preferred embodiment, the operators seat faces both to the front and to the right side. In this embodiment, the right rear corner post is provided with at least one operator control that is in the line of sight of the operator when seated in the operators seat.

DETAILED DESCRIPTION

Figure 1:
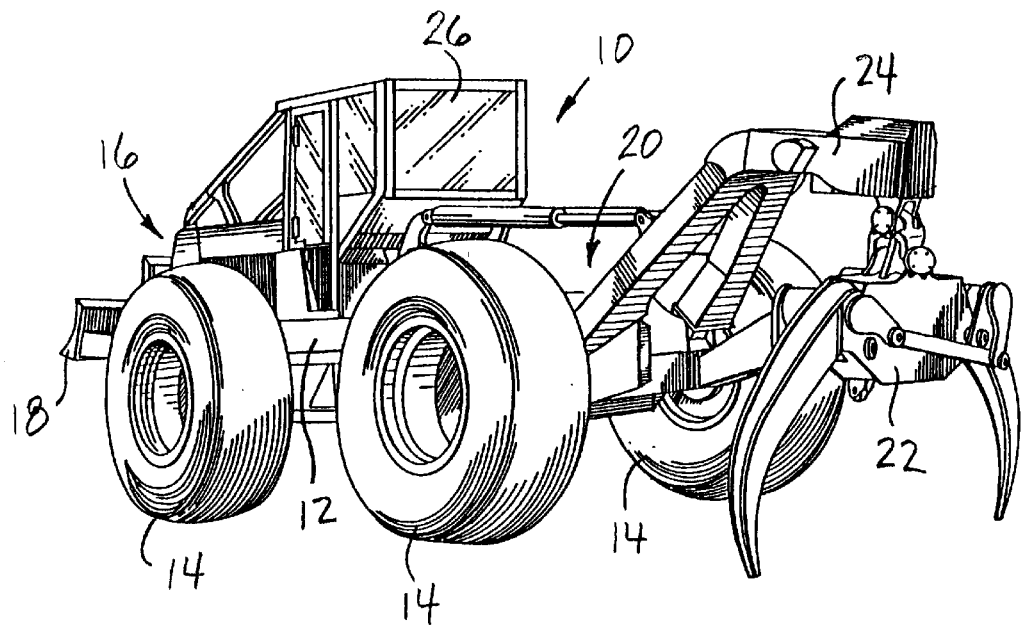
FIG. 1 is a rear perspective view of a logging skidder.

FIG. 1 illustrates an off road work vehicle which in the present example is a grapple skidder 10. The grapple skidder 10 is provided with a supporting frame 12 having ground engaging means 14 for supporting and propelling the vehicle. Although the illustrated embodiment discloses a vehicle having ground engaging wheels, the present invention could also be used on track laying vehicles of either the steel tracked type or the rubber tracked type. The supporting frame 12 is provided with a front portion 16 having a front mounted stacking blade 18, and a rear portion 20 having a rear mounted grapple 22 and associated grapple linkage 24. The operation of the vehicle is controlled from an operator cab 26.

The grapple 22 and grapple linkage 24 comprise a work implement for performing a work operation. The work operation is grabbing and dragging logs behind the skidder 10. Cable skidders perform the identical work operation except that a cable and choker is used to grab the logs. In agricultural tractors the rear portion mounted work implement comprises a hitch for dragging an implement behind the tractor through a field.

Figure 2:
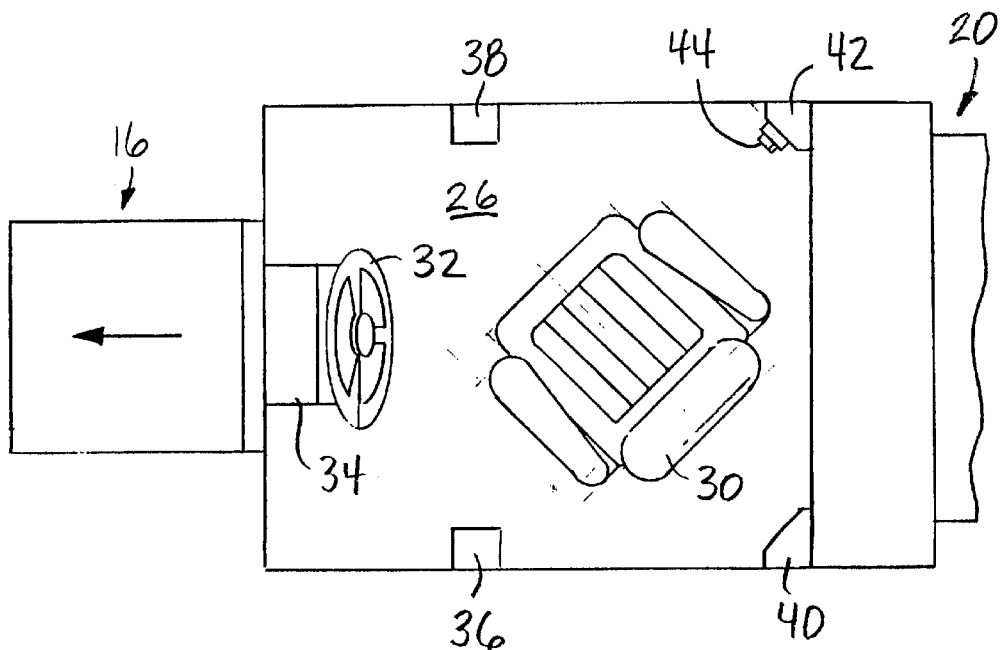
FIG. 2 is a top schematic view of an operators cab.
Figure 3:
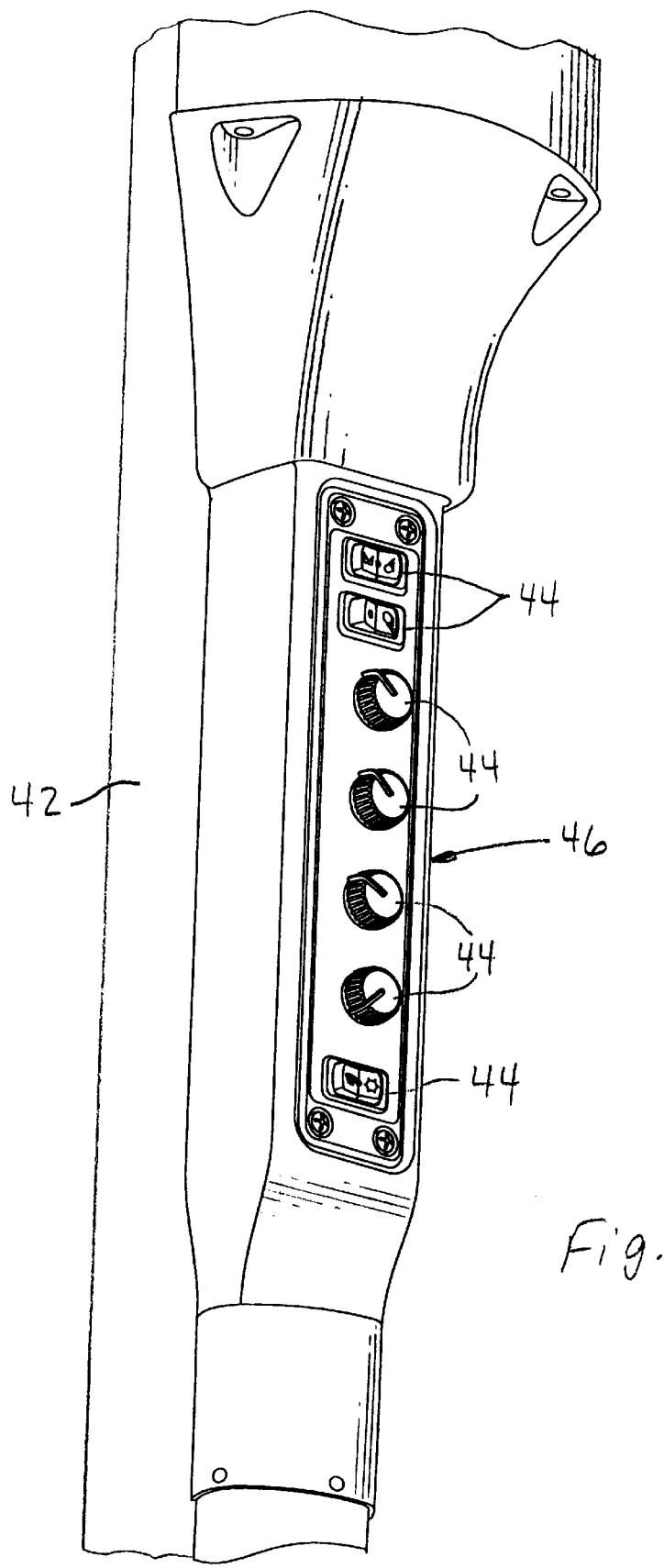
FIG. 3 is a perspective view of the right rear corner post of the operators cab.

The supporting frame 12 of the work vehicle defines a longitudinal center line that passes through the front portion 16 and the rear portion 20. As illustrated in FIG. 2 the operators cab 26 is provided with an operators seat 30 which is diagonal to the longitudinal center line of the vehicle. More specifically in the preferred embodiment, the seat 30 is faced forward and to the right to minimize operator neck strain and fatigue. It should be noted that in the illustrated embodiment, the seat 30 intersects the longitudinal centerline, however, the seat 30 could be diagonally arranged and offset from the line. The operator steers the vehicle by manipulating steering wheel 32 which extends upwardly and rearwardly from front console 34. Although not illustrated the front console may be provided with controls for controlling the operation of the work vehicle.

The operators cab is provided with left and right front supporting posts 36 and 38, respectively, and left and right rear supporting posts 40 and 42, respectively. These supporting posts 36–42 form part of the ROPS structure for the operators cab 26. In the preferred embodiment, operator controls 44 are mounted to the right rear post 42. In the grapple skidder 10 the operator control was part of a convenience group panel 46 having HVAC, lighting, wipers and other controls. The right rear post defines a silhouette when the operator is in the operators seat 30. The operator controls 44 are located within this silhouette so they do not interfere with the operators visibility. By locating these controls on the right rear post 42 the controls are within the operators line of sight when seated. In addition, damage to the controls is minimized by reducing their exposure. By locating the controls on the post they are more easily serviced and maintained. Furthermore, the number of controls located on the front console is reduced better facilitating their arrangement on the front console.

As discussed above, in the preferred embodiment the operators seat 30 faces right and the operator controls are mounted on the right rear corner post 42. However, the seat could also be diagonally arranged to the left and the controls mounted on the left rear corner post 40. As such, the invention should not be limited to the above described embodiments, but should be limited solely to the claims that follow:

We claim:

1. operators cab for a work vehicle, the operators cab comprising:
   an enclosure having a plurality of vertically extending supporting posts, at least one of the vertically extending supporting post being a rear post;
   a forwardly facing seat located in the operators cab in front of the rear post; and
   at least one operator control is mounted to the rear post.

2. An operators cab as defined by claim 1 wherein the rear post defines a silhouette when viewed by an operator seated in the forwardly facing seat, and the at least one operator is positioned within the silhouette of the rear post.

3. An operators cab as defined by claim 2 wherein the rear post forms part of a roll over protection system for the operators cab.

4. An operators cab as defined by claim 3 wherein the rear post is a right rear corner post of the operators cab and the forwardly facing seat is located to the left of the right rear corner post.

5. A work vehicle for performing a work operation; the work vehicle comprising:

a supporting frame having a front portion and a rear portion, the supporting frame defining a longitudinal centerline extending between the front portion and the rear portion;

ground engaging means attached to the supporting frame for propelling the work vehicle;

a work implement located on the rear portion of the work vehicle;

an operators cab is mounted on the supporting frame and is provided with a plurality of supporting posts, one of the supporting posts being a right rear post, a forwardly facing seat facing away from the work implement is positioned in the operators cab to the left of and in front of the right rear post, the right rear post being provided with at least one operator control.

6. A work vehicle as defined by claim 5 wherein the forwardly facing seat is diagonally arranged relative to the longitudinal centerline of the supporting frame so that an operator faces forward and to the right when the operator is seated in the forwardly facing seat.

7. A work vehicle as defined by claim 6 wherein the right rear post defines a silhouette when viewed by an operator seated in the forwardly facing seat, and the at least one operator control is positioned within the silhouette of the right rear post.

8. A work vehicle as defined by claim 7 wherein the right rear post forms part of a roll over protection system for the operators cab.

9. A work vehicle as defined by claim 8 wherein the right rear post is a corner post of the operators cab.

10. A work vehicle as defined by claim 9 wherein the work implement is used to drag a body behind the work vehicle.

11. A work vehicle for performing a work operation; the work vehicle comprising:

a supporting frame having a front portion and a rear portion, the supporting frame defining a longitudinal centerline extending between the front portion and the rear portion;

ground engaging means attached to the supporting fame for propelling the work vehicle;

a work implement located on the rear portion of the work vehicle;

an operators cab is mounted on the supporting frame and is provided with a plurality of supporting posts, one of the supporting posts being a rear post, a forwardly facing seat facing away from the work implement is positioned in the operators cab in front of the rear post and is diagonally arranged to the longitudinal centerline, the rear post being provided with at least one operator control.

12. A work vehicle as defined by claim 11 wherein the rear post defines a silhouette when viewed by an operator seated in the forwardly facing seat, and the at least one operator control is positioned within the silhouette of the rear post.

13. A work vehicle as defined by claim 12 wherein the rear post forms part of a roll over protection system for the operators cab.

* * * * *